US008367157B2

(12) United States Patent
Fallais et al.

(10) Patent No.: US 8,367,157 B2
(45) Date of Patent: Feb. 5, 2013

(54) RADIATION CURABLE COMPOSITIONS

(75) Inventors: Isabelle Fallais, Tangissart (BE); Jean-Yves Salviato, Les Bons Villers (BE); Thierry Randoux, Braine l'Alleud (BE)

(73) Assignee: Cytec Surface Specialties, S.A., Brussels (BE)

( * ) Notice: Subject to any disclaimer, the term of this patent is extended or adjusted under 35 U.S.C. 154(b) by 811 days.

(21) Appl. No.: 12/087,599

(22) PCT Filed: Feb. 2, 2007

(86) PCT No.: PCT/EP2007/051045
§ 371 (c)(1),
(2), (4) Date: Aug. 28, 2008

(87) PCT Pub. No.: WO2007/093512
PCT Pub. Date: Aug. 23, 2007

(65) Prior Publication Data
US 2009/0004377 A1    Jan. 1, 2009

(30) Foreign Application Priority Data

Feb. 13, 2006 (EP) .................................... 06002811

(51) Int. Cl.
*C08F 2/50* (2006.01)
*B05D 3/12* (2006.01)
*B05D 3/06* (2006.01)

(52) U.S. Cl. ............ 427/178; 522/93; 522/96; 522/113; 522/114; 522/120; 522/121; 522/150; 522/151; 522/152; 522/173; 522/174; 522/90; 528/44; 528/59; 528/65; 528/83; 528/84; 428/423.1; 427/177

(58) Field of Classification Search ............... 522/90, 522/96, 93, 113, 114, 120, 121, 150, 151, 522/152, 173, 174; 528/44, 59, 65, 83, 84, 528/85; 428/423.1
See application file for complete search history.

(56) References Cited

U.S. PATENT DOCUMENTS

| 4,668,763 | A | * | 5/1987 | Muller et al. ................. 528/296 |
| 5,416,880 | A | | 5/1995 | Edwards et al. |
| 5,498,670 | A | | 3/1996 | Aoyama et al. |
| 5,900,473 | A | * | 5/1999 | Acevedo et al. ............. 528/271 |
| 2003/0045599 | A1 | | 3/2003 | Khudyakov et al. |

FOREIGN PATENT DOCUMENTS

| CN | 1675276 | 9/2005 |
| EP | 0 882 749 B1 | 3/2004 |
| JP | 62-54710 | 3/1987 |
| JP | 2002-3800 | 1/2002 |
| WO | 90/11307 | 10/1990 |
| WO | 98/58006 | 12/1998 |
| WO | 2004/014978 | 2/2004 |

* cited by examiner

*Primary Examiner* — Sanza McClendon
(74) *Attorney, Agent, or Firm* — Wenderoth, Lind & Ponack, L.L.P.

(57) ABSTRACT

Radiation curable compositions comprising at least one radiation curable oligomer responding to a structure (C)—(B)-(A)-[(B)(C)]$_x$ wherein (A) is the residue of one or more hydroxyl functional polyester having a molecular weight M$_N$ higher than 900, a T$_G$ and/or Tm of 5 less than 30° C., and which is obtained from an acid constituent comprising at least 75 mole % of saturated aliphatic polyacid and, optionally, 0 to 25 mole % of another polyacid and an alcohol constituent, (B) is the residue of one or more polyisocyanate, (C) is the residue of one or more ethylenically unsaturated hydroxyl compound, and x is from 0.5 to 10.

10 Claims, No Drawings

RADIATION CURABLE COMPOSITIONS

The invention relates to radiation curable compositions, especially usable for coil coating. Coil coaters coat metal coils of various types and forms. Coil coating is a continuous and highly automated process for coating metal at high speed before fabrication. The process usually consists of the following steps. The metal coil is unwound and both the top and bottom sides are mechanically and chemically cleaned to remove oil, grease and dirt. After cleaning, a chemical pre-treatment can be applied to the sheet in order to enhance the corrosion protection and the paint adhesion. The strip then moves directly into a drying oven before entering the coating unit. After the paint has been applied, the strip moves again into a drying oven before being cooled and rewound for shipment. The precoated sheets are used in the metal-processing industry. So, many metal articles are not coated or painted as used or when assembled, but are first coated as flat stock provided in coils and then formed, cut and assembled into the desired articles. As a consequence, a key criterion in almost all cases is the ability to post form or bend the coated strip. Post forming is usually done by high speed processing equipment wherein the metal bending can be very severe. The coating must be flexible to allow the post forming or bending to occur without cracking and yet maintain adhesion. The full system what means the metal, in some cases the protective zinc layer, the pretreatment layer and the paint layer has also to reach a high level of corrosion resistance. Basic properties like chemical and stain resistance remain important and for some applications, properties like humidity and sterilization tests resistance are also required.

Radiation curable systems could be a good fit for coil coating; the substrate is flat, the line speed is high, it can solve environmental issues like the use of solvents and it requires less energy and floor space than the curing ovens necessary with other coating technologies. However until now, radiation curable coating compositions, especially UV formulations have not been widely used for coil coating applications. Typical UV formulations consist of (meth)acrylated oligomers and reactive diluents, which when cured, form a highly crosslinked coating layer having good properties such as chemical resistance, scratch resistance and surface hardness. Such high crosslink density is also associated with a limited flexibility and shrinkage of the film limiting adhesion on the metal substrate. When trying to find solutions to these stringent requirements, one is often limited between lowering the molecular weight to achieve a reasonable viscosity and the need for a substantive molecular weight between crosslinks in order to reach the required cured coating flexibility.

For coil coating applications where a high level of flexibility is essential for post forming operations, typical UV formulations are not suitable. US 2002/0132059 A1 describes the principle of using a photopolymerizable coating composition for the coating of a coiled metal sheet. In the method for applying a coating to coiled metal sheet therein described, the metal sheet is first cleaned and then pretreated before applying the coating composition. No specific photopolymerizable compositions are disclosed in this patent application. However not all photo-polymerizable coating compositions comprising unsaturated oligomers permit to obtain satisfying results when used in coil coating processes.

We have now found new radiation curable oligomers which are very suitable for being used in photo-polymerizable compositions.

Therefore the present invention relates to a radiation curable composition comprising at least one radiation curable oligomer having an amount of polymerizable ethylenically unsaturated groups of at least 0.3 meq/g and responding to following structure (I)

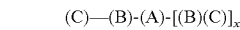

wherein (A) is the residue of one or more hydroxyl functional polyester having a molecular weight $M_N$ of higher than 900, a glass transition temperature $T_G$ and/or melting temperature $T_m$ of less than 30° C., and which is obtained from an acid constituent comprising at least 75 mole % of saturated aliphatic polyacid having from 4 to 14 carbon atoms and, optionally, 0 to 25 mole % of another polyacid, and an alcohol constituent, (B) is the residue of one or more polyisocyanate, (C) is the residue of one or more ethylenically unsaturated hydroxyl compound, and x is from 0.5 to 10.

In the radiation curable oligomers of structure (I), (A) and (B), respectively (C) and (B), are connected via an urethane group —O—CO—N—.

In the radiation curable oligomers of structure (I), x is preferably from 0.5 to 5, more preferably from 0.9 to 1.5, most preferably about 1.

By polymerizable ethylenically unsaturated groups is meant to designate in the present invention carbon-carbon double bonds which under the influence of irradiation and/or a (photo)initiator can undergo radical polymerization. The polymerizable ethylenically unsaturated groups are generally chosen from (meth)acrylic and allylic groups, preferably (meth)acrylic groups, most preferably acrylic groups. In the present invention, the term "(meth)acryl' is to be understood as to encompass both acryl and methacryl compounds or derivatives as well as mixtures thereof.

The amount of ethylenically unsaturated groups can be measured by a titration method in which the unsaturated product is reacted with bromine by addition of an excess of bromate-bromide solution to an acidified solution of the sample. After a suitable reaction time, potassium iodide is reacted with the bromine access to form iodine. Iodine is then titrated with sodium thiosulfate allowing calculation of the amount of unsaturated groups.

Preferably the amount of polymerisable ethylenically unsaturated groups is at least 0.4 meq/g, especially at least 0.5 meq of polymerisable ethylenically unsaturated groups per g of radiation curable oligomer.

Preferably the amount of polymerisable ethylenically unsaturated groups does not exceed 5 meq/g, especially not 2.5 meq/g.

The radiation curable oligomer preferably has a number average molecular weight of at least 1200, more preferably of at least 1800. Generally the radiation curable oligomer has a number average molecular weight not exceeding 10000, preferably not exceeding 7000, most preferably lower than 5000.

The radiation curable oligomer preferably has a glass transition temperature $T_G$ and/or melting temperature $T_m$ of less than 30° C., as measured by Differential Scanning Calorimetry according to ASTM D3418 with a heating gradient of 20° C. per minute.

The radiation curable oligomers of structure (I) are generally obtained from the reaction of one or more hydroxyl functional polyesters, one or more polyisocyanates and one or more ethylenically unsaturated hydroxyl compounds.

By hydroxyl functional polyester is meant to designate in the present invention a polyester having free, generally terminal, hydroxyl groups and generally having an hydroxyl number of 10 to 180 mg of KOH/g. The polyester used in the present invention preferably has an hydroxyl number of 20 to 80 mg of KOH/g, more preferably of 30 to 70 mg KOH/g.

The hydroxyl functional polyester used in the present invention is generally obtained from the reaction of an acid constituent comprising one or more polyacids with an alcohol constituent comprising one or more polyols. The polyester is preferably obtained from, with respect to the total amount of acid constituent, 75 to 100 mol % of at least one straight-chain saturated di-carboxylic aliphatic acid having from 4 to 14 carbon atoms and optionally from 0 to 25 mol % of at least one other aliphatic, cycloaliphatic and/or aromatic polycarboxylic acid and, with respect to the total amount of alcohol constituent, from 25 to 100 mol % of at least one branched chain aliphatic diol and optionally from 0 to 75 mol % of at least one other aliphatic or cycloaliphatic polyol.

The straight chain saturated aliphatic di-carboxylic acid having from 4 to 14 carbon atoms comprised in the polyester used in the present invention is preferably selected from succinic acid, adipic acid, glutaric acid, pimelic acid, suberic acid, azelaic acid, sebacic acid, dodecanedioic acid, undecanedioic acid, tridecanedioic acid, tetradecanedioic acid and the anhydrides thereof, alone or as a mixture. The straight chain saturated aliphatic diacid is most preferably adipic acid.

The other polycarboxylic acid optionally comprised in the polyester is generally chosen from di-carboxylic acids or the anhydrides thereof, more specifically from fumaric acid, maleic acid, phthalic anhydride, isophthalic acid, terephthalic acid, 1,4-cyclohexanedicarboxylic acid, 1,3-cyclohexanedicarboxylic acid, 1,2-cyclohexanedicarboxylic acid, alone or as a mixture. The polyester can also be a branched polyester obtained by incorporating up to 15 mol %, relative to the total amount of acid constituent, of a polyacid having at least three carboxylic acid groups or anhydrides thereof, such as trimellitic acid, pyrromellitic acid and their anhydrides, or mixtures thereof.

The polyester more preferably is obtained from 85 to 100 mole %, most preferably from 95 to 100 mol %, of straight chain saturated di-carboxylic aliphatic acid having from 4 to 14 carbon atoms, with respect to the total amount of acid constituent.

In stead of using polycarboxylic acids or in addition thereto, the corresponding anhydrides, esters or mixtures thereof may be used for the preparation of the polyesters.

The branched chain aliphatic diol used in the polyester is preferably selected from propylene glycol, neopentyl glycol, 1-methyl-1,3-propanediol 2-methyl-1,3-propanediol, 2-butyl-2-ethyl-1,3-propanediol, hydroxypivalate of neopentyl glycol and mixtures thereof. The branched chain aliphatic diol is most preferably neopentyl glycol.

The other aliphatic or cycloaliphatic polyol optionally comprised in the polyester is generally selected from di-, tri- and/or tetrafunctional polyols. Diols are preferably selected from ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,14-tetradecanediol, 1,16-hexadecanediol, 1,4-cyclohexanediol, 1,4-cyclohexanedimethanol, hydrogenated Bisphenol A and mixtures thereof. Polyalkylene glycols such as di and tri ethylene and propylene glycols can also be used. The diol is more preferably an aliphatic diol, particularly an alkyl-diol comprising from 2 to 12 carbon atoms. The polyester can also be a branched polyester incorporating of up to 30 mol percentage relative to the total amount of alcohol constituent, of polyols having 3 or more alcohol groups, preferably trifunctional and tetrafunctional polyols such as trimethylolpropane, ditrimethylolpropane, trimethylolethane, pentaerythrytol and mixtures thereof.

The polyester used in the present invention more preferably is obtained from 45 to 100 mol % of branched chain aliphatic diol, from 0 to 55 mole % of another aliphatic diol and from 0 to 30 mole % of tri- and/or tetrafunctional polyol, with respect to the total amount of alcohol constituent.

The polyester preferably has a number averaged molecular weight $M_N$ of at least 1000, more preferably at least 1500. The molecular weight $M_N$ of the polyester preferably does not exceed 9500, more preferably not 6500 and most preferably not 4500.

In the present invention the number average molecular weight $M_N$ can be obtained from formula $$M_N = \frac{\sum_j (M_{ac})_j + \sum_k (M_b)_k - M_{H2O}}{\sum_j (n_{ac})_j + \sum_k (n_b)_k - n_{H2O}}$$

wherein j and k indicate, respectively, the different polyacids and polyols used in the polyester synthesis, $M_{ac}$ represent the weight in grams of the polyacids, $M_b$ represent the weight in grams of the polyols used in the polyester synthesis, $n_{ac}$ and $n_b$ are the number of moles of, respectively, polyacids and polyols used in the polyester synthesis and $M_{H2O}$ and $n_{H2O}$ are, respectively, the weight in grams and the number of moles of water generated during the polyester synthesis.

The polyester is preferably an amorphous polyester. By amorphous polyester is meant to designate in the present invention a polyester which shows substantially no crystallization and which does not present a melting point as measured by Differential Scanning Calorimetry according to ASTM D3418 with a heating gradient of 20° C. per minute. The polyester more preferably has a glass transition temperature $T_G$ of from −120 to 25° C., as measured by Differential Scanning Calorimetry according to ASTM D3418 with a heating gradient of 20° C. per minute. The polyester preferably is a liquid at 25° C.

The polyisocyanate used in the present invention includes aromatic, cycloaliphatic and/or aliphatic polyisocyanates comprising at least two isocyanate functions. Preferred are aliphatic, cycloaliphatic and/or aromatic di-isocyanates, such as hexamethylene-diisocyanate (HMDI), isophorone-diisocyanate (IPDI), bis(4-isocyanatocyclohexyl)methane, toluene-diisocyanate (TDI), diphenylmethane-4,4'-diisocyanate (MDI), trimethylhexamethylene diisocyanate, tetramethyl-m-xylene diisocyanate. Particularly preferred are hexamethylene-diisocyanate (HMDI) and isophorone-diisocyanate (IPDI), as well as mixtures thereof. Optionally, isocyanate functional biurets, allophonates, and isocyanurates of the previously listed or similar isocyanates may be used.

By ethylenically unsaturated hydroxyl compound is meant to designate a compound which contains at least one hydroxyl group and at least one carbon-carbon double bound. Esters of multivalent aliphatic alcohols having 2 to 12 carbon atoms and unsaturated carboxylic acids, especially acrylic and methacrylic acid, are generally used.

Preferred are monohydroxy alkyl(meth)acrylates, especially those comprising from 4 to 40 carbon atoms, such as hydroxymethyl (meth)acrylate, hydroxyethyl acrylate (meth), hydroxypropyl (meth)acrylate, hydroxybutyl (meth)acrylate, glycerol di(meth)acrylate, trimethylolpropane di(meth)acrylate, pentaerythritol tri(meth)acrylate, ditrimethylolpropane tri(meth)acrylate, dipentaerythritol penta(meth)acrylate and their (poly)ethoxylated and/or (poly)propoxylated equivalents. Preferred are monohydroxy alkyl (meth)acrylates comprising from 4 to 10 carbon atoms. Acrylates are preferred. Particularly preferred is 2-hydroxyethyl acrylate. Other monohydroxy, ethylenically unsaturated compounds can also be employed. These include vinyl ethers, allyl ethers, vinyl esters, itaconate, crotonate compounds and the like.

The radiation curable oligomer can produced in many ways. For example, it may be made by pre-reacting a polyisocyanate with an ethylenically unsaturated hydroxyl compound to form a monoisocyanate, which is later reacted with a hydroxyl functional polyester. Alternatively, an hydroxyl functional polyester, polyisocyanate and ethylenically unsaturated hydroxyl compound may be reacted together at once, or an hydroxyl functional polyester and polyisocyanate may be reacted first and this product reacted further with an ethylenically unsaturated hydroxyl compound. The latter process is preferred.

The reaction is generally conducted under heat and in the presence of one or more catalysts. One or more polymerisation inhibitors may be added during or after the reaction.

The relative amounts of polyester, polyisocyanate and ethylenically unsaturated compound used in the synthesis of the radiation curable oligomer are generally chosen in order to avoid chain extension by incorporating more than one residue of polyester (A) into the oligomer backbone and forming structures responding to the formula (II) (C)—(B)-(A)-[(B)-(A)]$_n$-(B)—(C) wherein n>0. In general, it is preferred to use compositions comprising less than 10% by weight, more preferably less than 5% by weight of structures of formula (II).

When a preparation process is used wherein the hydroxyl functional polyester and the polyisocyanate are reacted first or together with the ethylenically unsaturated hydroxyl compound, the relative amounts of polyester and polyisocyanate used are generally such that the number of moles of polyisocyanate used to the number of equivalents OH provided by the hydroxyl functional polyester is at least about 0.95 preferably at least about 1. The quantity of ethylenically unsaturated hydroxyl compound is then preferably such that the all residual free isocyanate groups are reacted with this compound.

When a preparation process is used wherein the polyisocyanate is pre-reacted with an ethylenically unsaturated hydroxyl compound, the relative amounts of these compounds are generally such that a monoisocyanate is formed first. This monoisocyanate can then be further reacted with the hydroxyl functional polyester in relative amounts wherein the equivalent ratio of OH groups provided by the hydroxyl polyester to the NCO groups is about 0.8 to 1.3, preferably 1 to 1.2.

The radiation curable oligomers according to the invention can be prepared as such, but can also be prepared in the presence of a diluent which is copolymerisable with the radiation curable oligomers. According to a preferred embodiment, at least one radiation curable diluent is added to the radiation curable oligomers, during, at the end of and/or after their synthesis.

The radiation curable composition according to the invention generally contains at least 5%, preferably at least 15%, more preferably at least 25%, by weight of radiation curable oligomer. The amount of radiation curable oligomer usually does not exceed 95% by weight, preferably 80% by weight of the curable composition.

The radiation curable composition according to the invention preferably contains, besides the one or more radiation curable oligomers, at least one radiation curable diluent. This diluent is preferably a copolymerizable ethylenically unsaturated monomer, more preferably a mono- or polyfunctional (meth)acrylate monomer. By copolymerizable ethylenically unsaturated monomer is meant to designate monomers that are copolymerisable with the radiation curable oligomer, generally under photo-polymerisation conditions, especially by irradiation. Preferred copolymerizable ethylenically unsaturated monomers are mono- and polyfunctional (meth)acrylates comprising at least one and preferably not more than 6 (meth)acrylate groups, especially monofunctional (meth) acrylates, that are compounds comprising one (meth)acrylate group. Examples of suitable monomers include octyl-decyl acrylate, lauryl acrylate, phenoxyethyl acrylate, isobornyl acrylate, phenylglycidyl ether acrylate, cyclic trimethylolpropane formal acrylate, n-butyl acryloyloxy ethyl carbamate, tetrahydrofurfuryl acrylate, the reaction products of acrylic acid with the glycidyl ester of aliphatic carboxylic acids such as neodecanoic acid and their mixtures. Most preferred diluents are phenoxyethyl acrylate, isobornyl acrylate, n-butyl acryloyloxy ethyl carbamate, tetrahydrofurfuryl acrylate, the reaction products of acrylic acid with the glycidyl ester of aliphatic carboxylic acids such as neodecanoic acid and their mixtures. The amount of radiation curable diluent present in the radiation curable composition is generally from 0 to 95%, preferably from 5 to 75%, more preferably from 10 to 50%, by weight.

The radiation curable composition preferably presents a viscosity of 100 to 8000 mPa·s at 25° C., preferably from 1500 to 3500 mPa·s, as measured according to ISO 12058.

The radiation curable composition used in the process according to the invention usually also contains at least one inhibitor. Inhibitors include without limitation hydroquinone, toluhydroquinone, monomethyl ether hydroquinone, tert-butyl hydroquinone, di-tert-butyl hydroquinone, phenothiazine. The amount of inhibitor used is preferably from 0 to 0.5% by weight.

The radiation curable composition may also comprise at least one photochemical initiator and/or chemical initiator, capable of initiating the polymerization of the radiation curable oligomer and optionally the other radiation curable compounds present therein. Photochemical initiators (also called photoinitiators) are compounds that can generate radicals by absorption of light, typically UV light. The photoinitiators are preferably free-radical photoinitiators.

When cured under UV-light, curable compositions comprising at least one photoinitiator are preferred. The amount of photoinitiator or chemical initiator in the composition is preferably comprised between 0.01 and 5 wt %.

Alternatively, the composition can be cured in the absence of an initiator, especially by electron beam radiation.

The radiation curable composition may also contain one or more adhesion promotors. The amount of adhesion promotors is generally from 0 to 20% by weight. Preferably an amount of 2 to 15% by weight of adhesion promotor is used.

The radiation curable composition according to the invention may also comprise pigments, colorants and/or other additives such as multifunctional (meth)acrylated compounds, conductive pigments, dispersing agents, flow modification agents, slip agents, fire retardant agents, UV-protection agents. The amount of additives preferably does not exceed 10% by weight.

The radiation curable compositions according to the invention are preferably substantially free of water and organic solvents which are considered as being volatile organic compounds (VOC's). Hence, the compositions are generally considered as 100% solids radiation curable composition, which do not need evaporation of water or solvent during subsequent curing.

The radiation curable compositions according to the invention permits to obtain coatings having an good chemical and solvent resistance, scratch resistance and surface hardness together with an improved flexibility, adhesion and resistance to cracking on bending and rapid deformation and improved corrosion resistance. The coatings have an improved balance of flexibility and surface hardness. These properties makes them suitable for being used in a large number of applications such as coating applications on substrates such as metal, plastics and glass. The compositions according to the invention are suitable for a large number of applications, such as metal coating and decoration, especially as coating for agricultural and construction equipment, pipe coating, wire coating such as copper wire coating, automotive applications, especially as primer in automotive refinish, and can coating. The radiation curable composition can also be used in thermoforming applications, such as in-mold decoration. The composition is also suitable to be used for making electrical sleeves and glass laminates. The compositions are especially useful for coating flexible substrates such as packaging materials and plastics. The radiation curable composition is also useful for the formulation of UV-curable screen inks presenting high flexibility and impact resistance.

The present invention therefore also relates to the use of a composition as described here above for coating applications and especially to a process for preparing a coated article comprising a step wherein the article is coated with a composition as described here above.

The radiation curable compositions have been found particularly suitable for metal coating, especially for coil coating applications. The present invention therefore also relates to their use for metal and coil coating applications and especially to a process for preparing a coated metal sheet coil comprising the following steps:
(1) decoiling of the coiled metal sheet;
(2) coating the metal sheet with a curable composition comprising at least one radiation curable oligomer as described here above;
(3) curing the composition; and
(4) recoiling the coated metal sheet.

The metal sheet is generally chosen from cold rolled steel (with or without pre-treatment), hot rolled steel (with or without pre-treatment), stainless steel, Zn-treated steel (with or without pre-treatment), such as electro-zinced and hot dip galvanized steel, Al (with or without pre-treatment) and hot dip tin.

In the process according to the invention, the decoiling and recoiling of the metal sheet can be done by any means suitable therefore. In the process according to the invention the decoiled metal sheet can be submitted to any suitable treatment before coating it with the curable composition. The decoiled metal sheet is usually cleaned in order to remove the protection oil layer. After cleaning, a chemical pretreatment can also applied to the sheet in order to enhance the corrosion protection and the coating adhesion.

In the process according to the invention, the radiation curable composition can be applied to the article to be coated, especially to the metal sheet, by any means suitable therefore such as dip coating, spray coating, electrostatic coating, film coating, curtain coating, vacuum application, roll coating or the like. It is preferably applied by roll coating. The application of the curable composition to the article, especially to the metal sheet can be done at any suitable temperature, such as room temperature or at a higher temperature, for example by heating the metal sheet, the roller coater and/or the curable composition.

After the coating of the article or the metal sheet with the curable composition, the latter is cured. Curing, i.e. polymerisation can be achieved by any suitable means well known to those skilled in the art, such as thermal curing or irradiation. The irradiation curing can be done by using UV light or ionising radiation such as gamma rays, X-rays or electron beam. In the process according to the invention, electron beam and especially UV-radiation are preferred.

After the curing of the curable composition, the coated metal sheet can be re-coiled immediately or one or more additional coatings can be applied thereto before re-coiling or the recoiled coated metal sheet can be moved to another coating line where one or more additional coatings can be applied thereto. In the process according to the invention, steps (2) and (3) can be repeated in order to coat the metal sheet with two or more curable compositions as defined here above. In this case, the curable compositions can be the same or different.

The process according to the invention permits to obtain coated articles, especially metal coils with a reduced amount or even without the use of solvents, hence a reduced fire hazard and reduction of energy use, need for elimination or recycling of solvents and space saving on the line (no drying ovens necessary).

The process according to the invention permits to obtain coated articles, especially metal sheets having an improved chemical and solvent resistance, scratch resistance and surface hardness together with an improved flexibility, adhesion and resistance to cracking on bending and rapid deformation and improved corrosion resistance which make them suitable for being used for postforming. The coatings have an improved balance of flexibility and surface properties.

The process according to the invention when used to apply a curable primer on the galvanization or electrozinc line after deposition of the zinc layer onto the metal surface could permit to avoid some or all of the following steps of the current process: oiling of the strip before recoiling on the galvanization or electrozinc line, chemical cleaning, chemical pretreatment and application of a classical primer on the coating line. Chemical pretreatment is often a chromatation using Cr VI, the use of the process according to the invention would permit to solve this environmental issue. The process according to the invention permits to obtain coated metal coils having a good corrosion resistance even without the use of chemical pretreatments of the metal, for example by chromatation.

The examples which will follow illustrate the invention without limiting it. Except when otherwise indicated, the parts mentioned in the examples are parts by weight.

Preparation Example 1

Hydroxyl Functional Polyester PE1

In a reactor of 2 liters connected with a heating jacket and equipped with a stirrer, were added 513 g of neopentylglycol and 646 g of adipic acid. The reaction mixture was stirred and heated progressively to 215° C. under nitrogen flow, the water being removed by distillation. When the acid value reached about 50 mg KOH/g, 0.20 g of FASCAT 4102 (tin catalyst) was added at atmospheric pressure and the reaction mixture was further heated at 215° C., the water being removed under vacuum until the acid value was lower than 1 mg KOH/g. The polyester obtained was a transparent liquid with a hydroxyl number of 56 mg KOH/g; its average molecular weight was about 2000.

Preparation Example 2

Hydroxyl Polyester PE 2

A polyester was prepared according to the method described in Preparation Example 1, except that 223 g of 1,4-butanediol, 272 g of neopentylglycol and 670 g of adipic acid were used. The polyester was a transparent liquid with a hydroxyl value of 56 mg KOH/g; its average molecular weight was about 2000.

Example 1

Preparation of the Radiation Curable Oligomer 2616 g of the polyester PE1, 2.35 g of trisnonylphenylphosphite (TNPP), 581 g of isophorone diisocyanate and 0.69 g of dibutyltindilaurate (DBTL) were placed into a reaction flask equipped with an agitator, liquid addition funnel and thermometer. The reaction mixture was heated to 60° C. and stirred until the NCO content was about 3.43%. The addition funnel was fed with a mixture of 304 g of 2-hydroxylethyl acrylate (HEA), 1.18 g of TNPP, 0.70 g of HQ and 1.18 g of DBTL which was added in 2 hours. The reaction mixture was maintained at 70° C. until the residual NCO content was lower than 0.2%. 0.22 g of HQ, 0.27 g of TNPP were added. An oligomer with a viscosity (Höppler, ISO 12058 at 60° C.) of 35600 mPas and a C=C content of 0.67 meq/g was obtained.

Example 2

Example 1 was repeated, except that at the end of the process, 1503 g of isobornyl acrylate (IBOA) were added to the reaction product. A viscosity (Höppler, ISO 12058 at 60° C.) of 1600 mPas was obtained.

Alternatively, part of the IBOA (251 g) was added at the start of the reaction and another part (1252 g) was added together with the HEA. Similar results were obtained.

Example 3

116 g of isophorone diisocyanate, 0.14 g of DBTL, 0.04 g of HQ were placed into a reaction flask equipped with an agitator, liquid addition funnel and thermometer. The reaction mixture was heated to 40° C. 61 g of HEA were fed into the addition funnel and added dropwise to the reaction flask so that the temperature in the reaction flask did not exceed 65° C. The reaction mixture was stirred until the NCO content was about 12.33%. 523 g of the polyester PE1, 0.70 g of TNPP and 0.14 g of DBTL were then added to the flask. The reaction mixture was maintained at 70° C. until the residual NCO content was lower than 0.2%. 0.04 g of HQ, 0.05 g of TNPP and 301 g of IBOA were finally added. A viscosity (Höppler, ISO 12058 at 60° C.) of 1150 mPas was obtained.

Example 4

An oligomer was synthetized according to the procedure described in Example 1, using following amounts: 600 g of polyester PE 1, 0.54 g of TNPP, 104 g of toluene diisocyanate until the NCO content was about 3.57%. Then adding 70 g of HEA, 0.27 g of TNPP, 0.05 g of HQ and 0.15 g of DABCO, and finally 0.15 g of HQ and 0.27 g of TNPP.

Example 5

An oligomer was synthetized according to the procedure described in Example 1, using following amounts: 1000 g of polyester PE 2, 0.94 g of TNPP, 222 g of IPDI and 0.36 g dibutyltindilaurate until the NCO content was about 3.43%. Then adding 116 g of HEA, 0.67 g of TNPP, 0.67 g of HQ and 0.36 g of DBTL, and finally 0.33 g of HQ, 0.33 g of TNPP and 573 g of IBOA. A viscosity (Höppler, ISO 12058 at 60° C.) of 2000 mPas was obtained.

Comparative Example 6R

An acrylated polyester was prepared as follows: In a double jacket reactor of 1 liter connected to an oil bath equipped with a stirrer, were added 400 g of polyester PE 1, 31.7 g of acrylic acid, 14.2 g p-toluenesulfonic acid (PTSA), 288 g toluene, 0.73 g of copper oxide (Cu2O) and 0.55 g of MeHQ, 0.73 g of TNPP. The reaction mixture was heated up to reflux (115-120° C. in mass) under oxygen flow (1 m$^3$/h). Water was removed by azeotropic distillation. When no more water distilled, 0.6 g methylhydroquinone and 0.36 g TNPP were added and toluene was distilled under reduced pressure. The polyesteracrylate had a viscosity of 1544 mPas at 60° C.

Comparative Example 7R

An acrylated polyester was prepared as in Comparative example 6R except that 400 g of polyester PE 2, acrylic acid 31.7 g; PTSA 14.2 g, toluene 288 g, Cu2O 0.73 g, MeHQ 0.55 g and TNPP 0.73 g were used. MeHQ 0.36 g and TNPP 0.36 g were added after the azeotropic distillation. The polyesteracrylate had a viscosity at 60° C. of 898 mPa·s (Höppler, ISO 12058 at 60° C.).

ExampleS 8 TO 14 and Comparative Examples 15R to 18R

UV Curable Formulations were Prepared by Mixing 90 parts of the product obtained in, respectively, example 1, 2, 3, 5, comparative example 6R, 7R, or commercial urethane acrylated (EBECRYL®210 and EBECRYL®8411)

5 parts adhesion promoter (EBECRYL®171)

3 parts photoinitiator (ADDITOL®CPK)

2 parts photoinitiator (TPO-L)

The UV formulations were applied by means of a 10 μm bar coater on hot dip galvanized steel (examples 8 to 11 and comparative examples 15R to 17R) or chromated electrozinc steel (examples 12 to 14) and exposed to UV radiations from a 120 W/cm non focalised medium pressure mercury vapour lamp to obtain tack free films.

The samples were tested for solvent resistance (ECCA T11), cross-hatch adhesion (ISO 2409), adhesion and resistance to cracking on bending (T-bend test EN 13523-7), adhesion and resistance to cracking on rapid deformation (reverse impact, ISO/DIS 6272-ASTM D 2794) and adhesion on slow drawn deformation (ISO 1520).

The results obtained are presented in the Table below

| Ex. | Oligomer of Ex. | Solvent resist. (MEK DR) | Cross hatch adhesion | Adhesion ISO 1520 (mm) | T-bend | | Reverse impact | |
|---|---|---|---|---|---|---|---|---|
| | | | | | adhesion | cracking | adhesion | cracking |
| 8 | Ex. 1 | 60 | 0 | >8 | 0 T | 0 T | >18 J | >18 J |
| 9 | Ex. 2 | >100 | 0 | >8 | 0 T | 0 T | >18 J | >18 J |
| 10 | Ex. 3 | 17 | 0 | >8 | 0 T | 0 T | >18 J | >18 J |
| 11 | Ex. 5 | 70 | 0 | >8 | 1 T | 0 T | >18 J | >18 J |
| 12 | Ex. 2 | >100 | 0 | >8 | 0 T | 0 T | >18 J | >18 J |
| 13 | Ex. 3 | 17 | 0 | 6 | >1 T | 0 T | >18 J | >18 J |
| 14 | Ex. 5 | 70 | 0 | >8 | 1 T | 0 T | >18 J | >18 J |
| 15R | Ex. 6R | 5 | 0 | 6 | >1 T | >1 T | 1.96 J | >18 J |
| 16R | Ex. 7R | 20 | 0 | 6 | >1 T | >1 T | 1.96 J | >18 J |
| 17R | EB ® 210 | >100 | 2 | >8 | >1 T | 0.5 T | <1.96 J | >18 J |
| 18R | EB ® 8411 | >100 | 0 | 4 | >1 T | | 1.96 J | |

As can be seen from the comparison of the results obtained here above, the oligomers according to the present invention permit to obtain coatings which have at the same time improved chemical and solvent resistance, together with an improved flexibility, adhesion and resistance to cracking on bending and rapid deformation.

The invention claimed is:

1. A process for preparing a coated coiled metal sheet, comprising the following steps:
   (1) decoiling of a coiled metal sheet;
   (2) coating the metal sheet with a radiation curable composition;
   (3) curing the radiation curable composition; and
   (4) recoiling the coated metal sheet,
   wherein the radiation curable composition comprises at least one radiation curable oligomer having an amount of polymerizable ethylenically unsaturated groups of at least 0.3 meq/g and responding to following structure (I)

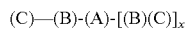
   (C)—(B)-(A)-[(B)(C)]$_x$ wherein (A) is the residue of one or more hydroxyl functional polyester having a molecular weight $M_N$ of higher than 900, a glass transition temperature $T_G$ and/or melting temperature $T_m$ of less than 30° C., and which is obtained from an acid constituent comprising at least 75 mole % of saturated aliphatic polyacid having from 4 to 14 carbon atoms and, optionally, 0 to 25 mole % of another polyacid, and an alcohol constituent,
   (B) is the residue of one or more polyisocyanate,
   (C) is the residue of one or more ethylenically unsaturated hydroxyl compound, and
   x is from 0.5 to 10, and
   wherein said radiation curable composition is substantially free of water and volatile organic compounds.

2. The process according to claim 1 wherein the curing step (3) is performed by using UV-light, ionizing radiation or electron beam.

3. The process according to claim 1, wherein the hydroxyl functional polyester has a hydroxyl number of 20 to 80 mg of KOH/g.

4. The process according to claim 1, wherein the hydroxyl functional polyester has an hydroxyl number of 10 to 180 mg of KOH/g.

5. The process according to claim 1, wherein the hydroxyl functional polyester is obtained from, with respect to the total amount of acid constituent, 75 to 100 mol % of at least one straight-chain saturated di-carboxylic aliphatic acid having from 4 to 14 carbon atoms and optionally from 0 to 25 mol % of at least one other aliphatic, cycloaliphatic and/or aromatic polycarboxylic acid and, with respect to the total amount of alcohol constituent, from 25 to 100 mol % of at least one branched chain aliphatic diol and optionally from 0 to 75 mol % of at least one other aliphatic or cycloaliphatic polyol.

6. The process according to claim 1, wherein the polyisocyanate is selected from aliphatic, cycloaliphatic and/or aromatic di-isocyanates.

7. The process according to claim 1, wherein the ethylenically unsaturated hydroxyl compound is selected from monohydroxy alkyl(meth)acrylates.

8. The process according to claim 1, wherein the radiation curable composition comprises at least 15% by weight of the radiation curable oligomer.

9. The process according to claim 1, wherein the radiation curable composition comprises from 5 to 75% by weight of at least one radiation curable diluent.

10. The process according to claim 9, wherein the radiation curable diluent is a monofunctional (meth)acrylate.

* * * * *

UNITED STATES PATENT AND TRADEMARK OFFICE
CERTIFICATE OF CORRECTION

PATENT NO. : 8,367,157 B2  Page 1 of 1
APPLICATION NO. : 12/087599
DATED : February 5, 2013
INVENTOR(S) : Fallais et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 895 days.

Signed and Sealed this

First Day of September, 2015

Michelle K. Lee
*Director of the United States Patent and Trademark Office*